Feb. 14, 1950 A. P. OLESKY 2,497,269

TUNING INDICATOR FOR RADIO RECEIVERS

Filed Sept. 20, 1944 2 Sheets-Sheet 1

INVENTOR.
Anthony P. Olesky
BY Mueller, Dodds + Mason
Attys.

Feb. 14, 1950 A. P. OLESKY 2,497,269

TUNING INDICATOR FOR RADIO RECEIVERS

Filed Sept. 20, 1944 2 Sheets-Sheet 2

INVENTOR.
Anthony P. Olesky,
BY Mueller, Dodds + Mason
Att'ys.

Patented Feb. 14, 1950 2,497,269

UNITED STATES PATENT OFFICE 2,497,269

TUNING INDICATOR FOR RADIO RECEIVERS

Anthony P. Olesky, Chicago, Ill., assignor, by mesne assignments, to Belmont Radio Corporation, Chicago, Ill., a corporation of Illinois Application September 20, 1944, Serial No. 554,890

3 Claims. (Cl. 116—124.1)

The present invention relates to tuning apparatus for radio receivers and more particularly to an improved device for indicating the station to which a receiver is tuned.

It is universal practice in the manufacture of radio receivers to provide some form of mechanically actuated scale and pointer mechanism for indicating the particular signal channel or station to which a receiver is tuned. The usual commercial mechanism of this character comprises a string or belt and pulley arrangement for converting rotary movement of the tuning shaft into linear translatory movement of the pointer. While such arrangements are reasonably satisfactory in operation and are fairly cheap to manufacture and assemble, they are open to the objection that the flexible link employed in the driving connection between the tuning shaft and pointer, i. e. the string or belt, is susceptible of breaking after an indeterminate period of use. As a result, receivers equipped with such indicating devices may require rather frequent servicing of this particular element thereof.

It is an object of the present invention, therefore, to provide an improved tuning indicator mechanism for a radio receiver, which is devoid of strings, belts or other flexible links in the driving connection between the receiver tuning means and the indicating means, and yet is of simple, cheap and rugged construction.

It is another object of the invention to provide for use in a radio receiver, an improved tuning device of the push button actuated type in which the number of required parts is reduced to a minimum by so arranging certain of the parts that they may perform two or more functions.

According to a further object of the invention, an elongated camming member provided with a helical camming surface is utilized to convert rotary movement of the tuning means into translatory movement of the indicating means and is also used as substantially the sole support for the indicating means, thus eliminating unnecessary duplication of elements in the structure.

In accordance with a still further object of the invention a part of the scale and pointer assembly of the indicating means is also arranged to act as a stop against which the push button manuals of the tuning device are normally biased.

The invention, both as to its organization and method of operation, together with further objects and advantages thereof, will best be understood by reference to the specification taken in connection with the accompanying drawings, in which.

Figure 1:
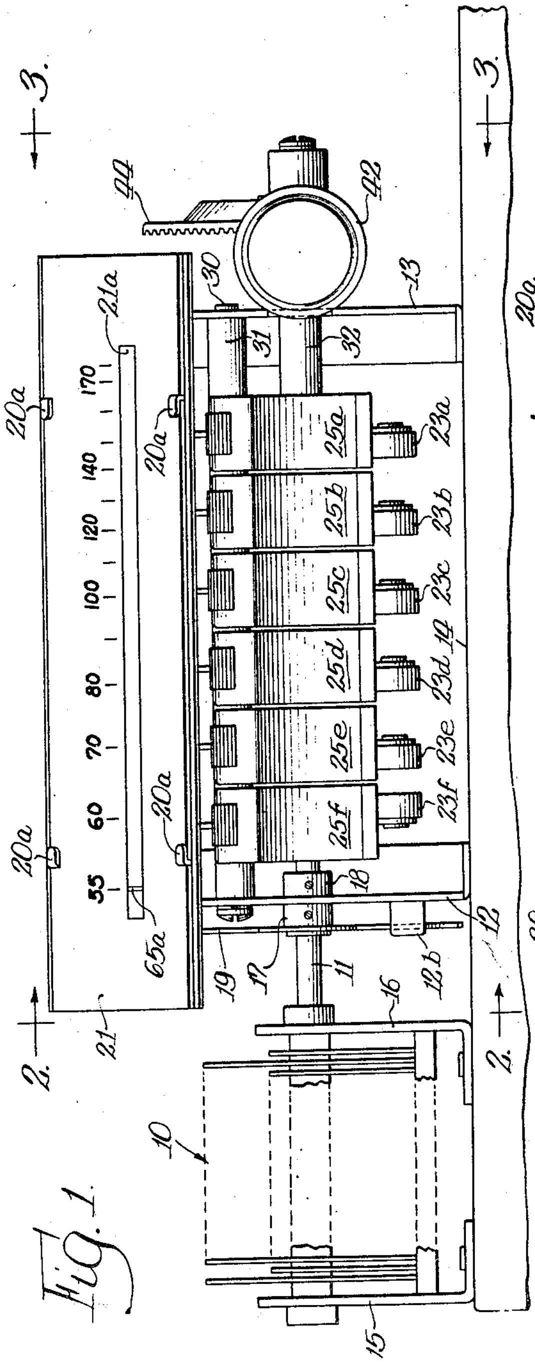
Fig. 1 is a side view illustrating improved tuning apparatus having embodied therein tuning indicator means characterized by the features of the present invention.
Figure 3:
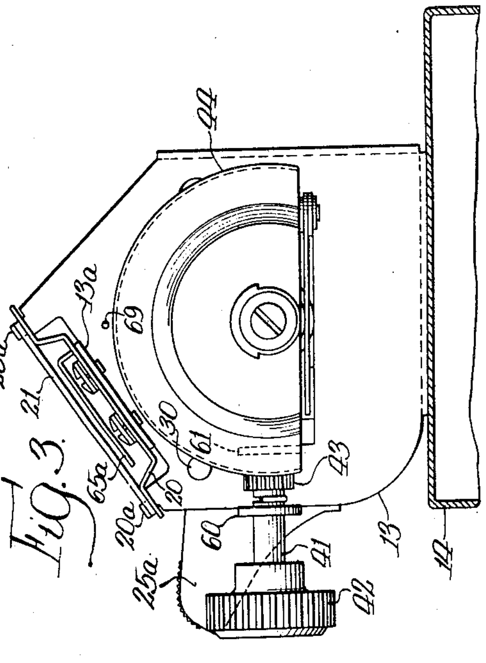
Fig. 3 is a view taken on line 3—3 of Figure 1.

Referring now to the drawings, the present improved indicating mechanism is there illustrated in its embodiment in the tuning apparatus for a radio receiver, which apparatus is used to adjust the gang-connected frequency changing elements of the receiver for the purpose of tuning the receiver to different signal channels, i. e., for the reception of signals radiated at different carrier frequencies. More specifically, the frequency changing means of the receiver comprises a multiple condenser unit 10 supported between two L-shaped bracket pieces 15 and 16 which are rigidly mounted upon the receiver chassis indicated generally at 14. The condenser unit is provided with a rotatable shaft 11 which carries the rotor plates of the condensers and may be rotated through 180° in covering the full tuning range of the receiver. It is journaled in bearing openings through the end members 15 and 16, and also in bearing apertures provided in two spaced apart supporting members 12 and 13 fixedly mounted upon the top wall of the chassis 14. The tuning condensers may be electrically included in the receiver circuit in any conventional manner.

Figures 4, 5, 6:
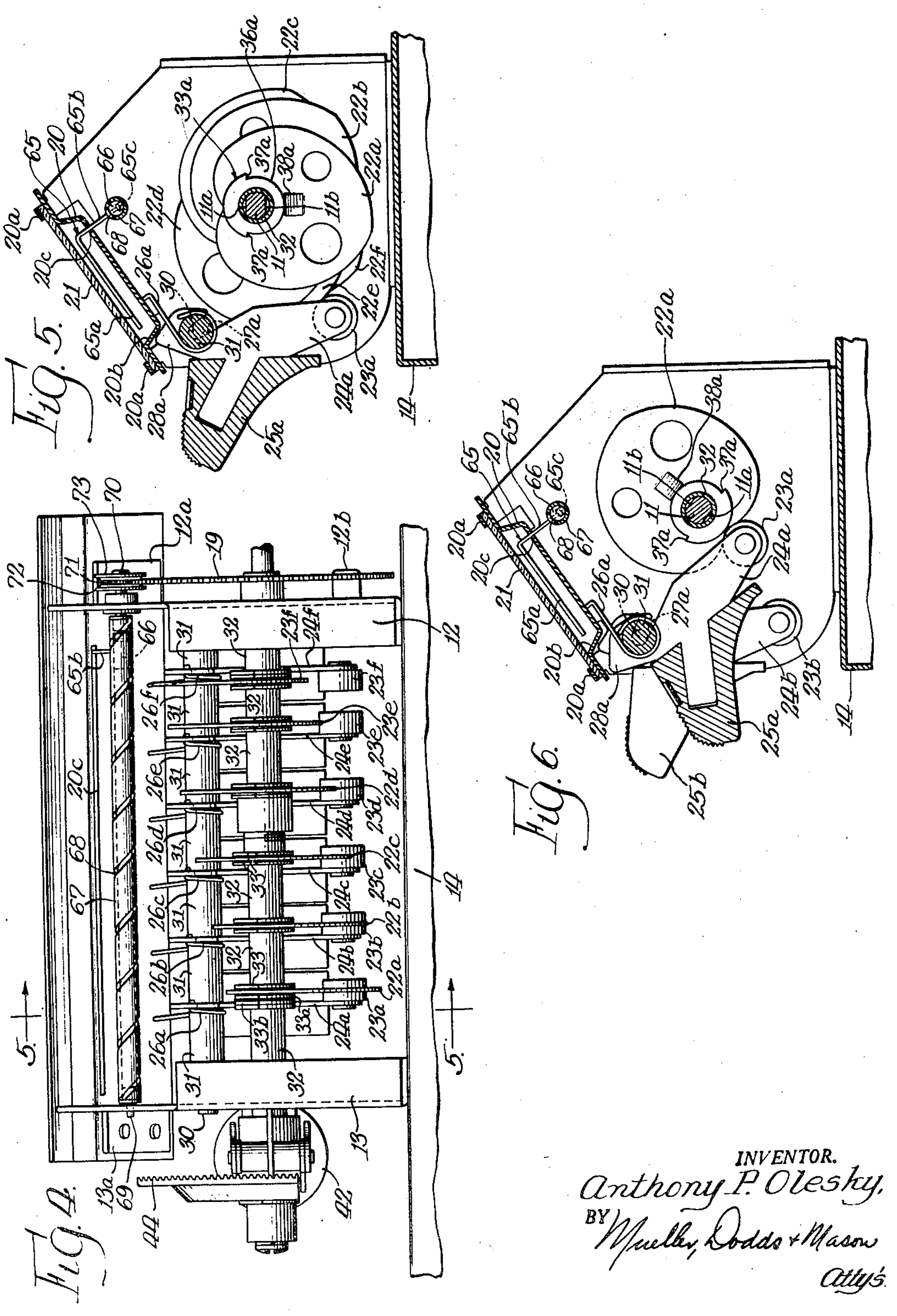
Fig. 4 is a rear view in perspective of the apparatus shown in Fig. 1.
Fig. 5 is a sectional view taken along the lines 5—5 of Fig. 4, illustrating one of the station selector elements and the push button manual for operating the same.
Fig. 6 is a duplication of Fig. 5, illustrating the parts in changed positions.

For the purpose of selectively actuating the condenser unit 10 to any desired setting within the tuning range thereof, push button actuated tuning apparatus is provided, which is best shown in Fig. 4 of the drawings, comprises a plurality of control or tuning selector elements 22 in the form of heart-shaped cams. These cams are mounted upon the shaft 11 in spaced apart positions axially of this shaft and are normally restrained against rotary movement relative to the shaft. Opposite the control elements are provided an equal number of push button manuals 25, each of which includes a lever 24 pivotally mounted at one end upon a pivot shaft 30, rotatably supports a cam actuating roller 23 at its opposite end, and is provided with a manually operable push button fixedly mounted upon an angular extended projection therefrom. The shaft or pivot rod 30 is supported at its ends by the supporting members 12 and 13, and carries spacing sleeves 31 intermediate the levers 24 for the purpose of maintaining the rollers 23 spaced apart in transverse alignment with their respective associated cams 22.

The members 12 and 13 are also utilized to support the novel tuning indicator means embodied in the apparatus and described with particularity hereinafter. At this point, it is noted that this means comprises an elongated channel-shaped member 20 extending longitudinally of the shaft 11 and having its channel-shaped walls disposed within the voids formed at the upper ends of the supporting members 12 and 13 by bending the parts 12*a* and 13*a* outwardly therefrom; these parts extending normal to the supporting members and being riveted to the bottom wall of the member 20 to securely anchor this member in place. The channel-shaped member 20 is also provided with side flanges which serve to seat a translucent member 21. This member is suitably apertured to receive lugs 20*a* struck upwardly from the side flanges of the member 20 and bent over the top surface of the member 21, thereby fixedly to assemble the two members 20 and 21 together. Preferably, the translucent member 21 is painted or etched at the under surface thereof to outline an elongated rectangular surface segment 21*a* which is left clear to function as a viewing window. At the upper surface thereof and immediately opposite one edge of the window 21*a*, the member 21 is suitably inscribed with numerals indicating carrier frequencies in kilocycles or with station call letters.

As best shown in Figs. 5 and 6 of the drawings, the levers 24 are spring biased by means of springs 26 individual thereto to normal positions such that the rollers 23 rotatably mounted thereon are out of engagement with the respective associated selector cams 24. Thus the lever 24*a* is illustrated as being biased to a normal position wherein the roller 23*a* pivotally supported thereby is wholly out of the path of rotation of the cam 22*a*. The means for thus biasing the lever 24*a* comprises a single turn coil spring 26*a* wrapped around the adjacent spacing sleeve 31 and having one end anchored to the nose 28*a* of the lever and its opposite end restrained against unwinding movement through engagement with the bottom wall of the channel-shaped member 20. In accordance with a specific feature of the present invention the indicated channel-shaped member is so positioned longitudinally of the shaft 11 as to act as a stop against which the noses 28 of the levers 24 are normally biased. To this end, the side wall 20*b* of the member 20 is positioned in the paths of rotation of the levers to be engaged by the noses thereof.

Referring now more particularly to the manner in which the selector cams 22 are normally restrained against rotary movement relative to the shaft 11, it will be noted by reference to Fig. 4 of the drawings that these cams are separated by spacing sleeves 32 carried by the shaft 11, and by friction washers 33 against which the ends of the sleeves 32 abut. More specifically, the shaft 11 carries a pair of set screw mounted collars 17 and 18 which are disposed upon opposite sides of the supporting member 12 and function to restrain the shaft against axial movement. The collar 18 is also used as a thrust member against which the selector cams 22, spacing sleeves 32 and washers 33 may be clamped for the purpose of frictionally locking the selector cams against rotation relative to the shaft 11. In order to restrain the washers 33 against rotation relative to the shaft 11, this shaft is provided with diametrically opposed flats 11*a* and 11*b* over the length thereof which extends from the collar 18 to the end farthest removed from the tuning condensers 10, and each washer is similarly provided with correspondingly flatted edges in the central aperture through which the shaft 11 extends. The washers 33 are also utilized to limit the extent of rotation of their respective associated selector cams 22 relative to the shaft 11. To this end, each washer is provided with a portion 36 of reduced diameter terminating in stop steps 37 against which a lug 38 struck out from the associated cam 22 is brought to bear at each limit of the range of rotation of the cam relative to the shaft. In the illustrated arrangement, each washer edge 36 of reduced diameter is sufficiently long to permit the associated cam 22 to be rotated through a maximum angle of 180° relative to the shaft 11. In order to enhance the frictional restraining force exerted upon the selector cams 22, the clamping faces of the washers 36 are stippled or roughened and small sandpaper discs are inserted between the washers 36 and the adjacent faces of the respective associated cams 22 with the sanded surfaces of the discs bearing against the selector cams.

For the purpose of exerting a clamping thrust axially upon the stacked parts 22, 32 and 33, and the sandpaper discs separating the washers 33 from the cams 22, thereby normally to maintain the cams 22 locked against rotary movement relative to the shaft 11, there is provided a novel cam locking and manual tuning mechanism. This mechanism is disclosed and claimed in copending application Serial No. 554,935, filed September 20, 1944, and which issued as Patent Number 2,460,211 on Jan. 25, 1949. In brief, this mechanism comprises a manual actuating shaft 41 which extends normal to the tuning shaft 11, and is connected to drive the shaft 11 through a pinion 43 and crown gear segment 44 and carries a tuning knob 42. The shaft 41 is journaled for rotary and axial movement in a pair of bracket pieces 60 and 61 struck out from the supporting member 13, and may be moved axially away from the shaft 11 through the pinion 43 without breaking the driving connection between the two shafts 11 and 41. The mechanism also comprises a thrust spring of the compression type which normally exerts a thrust axially of the shaft 11 upon the stacked parts 22, 32 and 33. It further includes a cam and lever device operative in response to axial movement of the shaft 41 outwardly away from the shaft 11 for compressing the thrust spring to the extent required to release the selector cams 22 for rotation relative to the shaft 11. Movement of the manual tuning shaft 41 axially in the reverse direction, i. e. toward the tuning shaft 11 serves to relieve the tension upon the compression spring, with the result that the thrust pressure is again impressed upon stacked elements 22, 32 and 33 to again lock these elements against rotation relative to the shaft 11.

Referring now more particularly to the apparatus which is provided to indicate the station to which the receiver is tuned, it is pointed out above that this apparatus comprises the translucent member 21 carried by the channel-shaped member 20, which two parts are fixedly supported by the supporting members 12 and 13. This apparatus further comprises translatable indicating means in the form of a pointer 65 which is linearly movable back and forth longitudinally of the two members 20 and 21 to settings indicative of the carrier frequency to which the receiver is tuned. More specifically, this pointer is in the form of a wire-like element having an indicator leg 65*a* disposed within the channel of the member 20 and extending transversely across the indicating window 21*a*, and a second leg 65*b* which extends normal to the leg 65*a* through a narrow guide slot 20*c* extending longitudinally of the bottom wall of the channel-shaped member 20 to engage the helical camming surface of a rotatable camming member 67. For the purpose of translating the pointer 65 along the slot 20*c*, a driving connection is provided between the shaft 11 and this pointer which includes a gear segment 19 fixedly mounted upon the collar 17. This gear segment meshes with a small gear 71 which is connected to drive the camming member 67 through a drive pin 70 which is journaled in a bearing part carried by the frame member 12 and is anchored within the right end of the tubular camming member 67. The gear segment 19 and pinion 71 are stamped parts formed from thin gauge stock, and in order to maintain the same in meshing engagement, dished fender discs 72 and 73 are provided upon opposite sides of the pinion 71 to embrace the peripheral segment of the gear 19 which meshes with the pinion 71.

More specifically considered, the camming member 67 is in the form of an edge-wound metal strip, the edges of which are displaced so that a helical camming groove 68 of only slightly greater width than the diameter of the pointer 65 is formed therebetween. Thus the edges of the strip act as helical camming surfaces. The leg 65*b* of the pointer 65 extends through the groove 20*c* to slidably engage the helical camming surfaces, and is anchored to an elongated travelling element 66 which is disposed within the tubular camming member 67 and is slidable longitudinally of this member as the pointer 65 is translated through engagement of the leg 65*b* with the camming surfaces. As best shown in Fig. 5 of the drawings, the travelling element 66 is in the form of a rod segment and is slotted longitudinally along one side to receive the end portion 65*c* of the pointer. This end portion of the pointer extends normal to the pointer leg 65*b* and may be soldered or otherwise bonded to the travelling element 66 within the slot in which it is disposed to provide a rigid connection therebetween. As indicated above, the means for rotatably supporting the camming member 67 includes the pin 70 journaled in the bearing part carried by the frame member 12. It also includes a pin 69 journaled in the frame member 13 and fixedly connected to the left end of the member 67.

Figure 2:
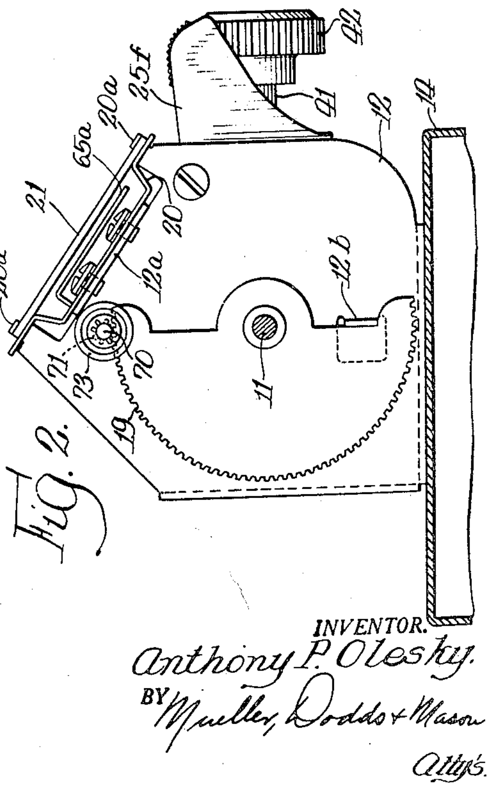
Fig. 2 is a view taken on line 2—2 of Figure 1.

As shown in Fig. 2 of the drawings, the gear segment 19 not only functions to drive the camming member 67, but is also utilized to limit the angle of rotation of the shaft 11. To this end, the frame member 12 is provided with a struck out stop part 12*b* disposed in the path of rotation of the gear segment 19 to be engaged by the straight edge portions of this gear segment when the shaft is rotated to the limits of its range of rotation.

In considering generally the operation of the tuning apparatus, it will be understood from the above explanation that normally the selector cams 22 are locked against rotation relative to the shaft 11 and that these cams occupy different angular positions relative to the shaft 11 such that the tuning condensers 10 may be operated to signal channel settings respectively corresponding to the different selector cams through selective manipulation of the manuals 25. Thus, if it is desired to tune the receiver for the reception of the particular signal corresponding to the manual 25*a*, for example the push button of this manual is pushed downwardly from the position illustrated in Fig. 5 of the drawings to the position illustrated in Fig. 6 of the drawings. During the resulting pivotal movement of the lever 24*a*, the roller 23*a* is brought into engagement with the periphery of the selector cam 22*a*, following which the two engaged parts 23*a* and 22*a* coact to rotate the tuning shaft 11 to the particular angular setting corresponding to the desired signal channel. This tuning position of the shaft is reached when the roller 23*a* is moved to engage the low point of the cam 22*a*. After it is reached, the manual 25*a* may be released to return to its normal position under the influence of the biasing spring 26*a*. In a manner entirely similar to that just described the other push button manuals 25 may be selectively actuated for the purpose of selectively tuning the receiver for the reception of signals from other transmitting stations to which these manuals respectively correspond. Tuning of the receiver to receive a signal within the signal reception band of the receiver, but not corresponding to one of the push button manuals 25, is accomplished through manual actuation of the knob 42 to rotate the shaft 41 and thus rotate the tuning shaft 11 through the driving connection afforded by the pinion 43 and the gear section 44.

Referring now more particularly to the operation of the improved indicating apparatus, it will be understood that when the tuning shaft 11 is rotated, either through actuation of the knob 42 or one of the manuals 25, the camming member 67 is rotated in a corresponding direction through the driving connection afforded by the meshing engagement of the gear segment 19 with the pinion 71. Since the pointer 65 is prevented from rotating with the camming element 67 through engagement of the leg 65*b* with the edges of the guide slot 20*c*, the rotary movement of the camming member is converted into translatory movement of the pointer, due to the following movement of the leg 65*b* along the helical cam groove 68. Translatory movement of the pointer 65 is obviously accompanied by sliding movement of the travelling element 66 within the tubular camming member 67. The extent of pointer movement per unit angle of rotation of the shaft 11 is, of course, determined by the pitch of the helical groove 68 and the tooth ratio between the gears 19 and 71. In the illustrated arrangement, these factors are so determined that the pointer 65 will move over the full scale range in response to rotation of the tuning shaft 11 through an angle of 180°. Further, the spacing of the scale indicia provided along the upper edge of the viewing window 21*a* is accurately calibrated so that the pointer 65 in indexing any scale marking provides an accurate indication of the signal channel to which the receiver is tuned. Thus an exceedingly simple, rugged and cheap structure is provided for accurately indicating the particular station to which the receiver is tuned.

On this point, it is noted that the use of guide rails or other extraneous supporting members for the translatable pointer 65 is rendered unnecessary by utilizing the camming member 67 as substantially the sole means of support for the pointer. Further, the elongated construction of the travelling element 66 positively precludes any tendency of the pointer to twist about the axis of the pointer part 65b and insures non-binding sliding movement of this element through the cam member 67.

While there has been described what is at present considered to be the preferred embodiment of the invention, it will be understood that various modifications may be made therein which are within the true spirit and scope of the invention as defined in the appended claims.

I claim:

1. In a radio receiver, the means for indicating the station to which the receiver is tuned, which comprises an elongated tubular camming member comprising an edge-wound strip having its edges displaced to define a helical camming groove, a traveling element disposed within said camming member and slidably movable longitudinally of said member, movable indicator means including a cam follower extending through said groove and anchored to said traveling element, whereby said indicator means is at least in part supported by said member, a stationary guide means adjacent said camming member having therein a straight guide slot extending parallel to said member, said cam follower extending through said guide slot and being slidable therein, whereby said indicator means is moved along said slot when said member is rotated, means supporting said member for rotation, and means operated concurrently with the tuning of said receiver for rotating said member, thereby to translate said indicator means to a setting indicative of the station to which the receiver is tuned.

2. In a radio receiver, the means for indicating the station to which the receiver is tuned which comprises an elongated stationary member having a longitudinally extending guide slot therein, an elongated camming member disposed beneath said stationary member in alignment with said slot and provided with a helical camming surface, means supporting said camming member for rotation, movable indicator means including a wire-like element extending through said slot and slidably engaging said camming surface, whereby said indicator means is moved along said slot during rotation of said camming member, and means operated concurrently with the tuning of said receiver for rotating said camming member, thereby to move said indicator means to a setting indicative of the station to which the receiver is tuned.

3. In a radio receiver, the means for indicating the station to which the receiver is tuned, which comprises an elongated stationary member having a longitudinally extending guide slot therein, an elongated tubular camming member disposed beneath said stationary member in alignment with said slot and comprising an edge-wound strip having its edges displaced to define a helical camming groove, an elongated traveling element disposed within said camming member and slidably movable longitudinally of said camming member, movable indicator means including a wire-like element extending through said slot and said groove and anchored to said traveling element, whereby said indicator means is at least in part supported by said camming member and is moved along said slot when said camming member is rotated, means supporting said camming member for rotation, and means operated concurrently with the tuning of said receiver for rotating said camming member, thereby to move said indicator means to a setting indicative of the station to which the receiver is tuned.

ANTHONY P. OLESKY.

REFERENCES CITED

The following references are of record in the file of this patent:

UNITED STATES PATENTS

| Number | Name | Date |
|---|---|---|
| 1,699,959 | Elliott | Jan. 22, 1929 |
| 2,110,757 | Clarke | Mar. 8, 1938 |
| 2,172,288 | Marholz | Sept. 5, 1939 |
| 2,188,136 | Lindsay et al. | Jan. 23, 1940 |
| 2,214,785 | Wells | Sept. 17, 1940 |
| 2,268,950 | Leishman | Jan. 6, 1942 |
| 2,302,122 | Hauton | Nov. 17, 1942 |
| 2,358,245 | Nichols | Sept. 12, 1944 |
| 2,364,764 | Wilks | Dec. 12, 1944 |

FOREIGN PATENTS

| Number | Country | Date |
|---|---|---|
| 771,301 | France | June 23, 1933 |